United States Patent
Balijepalli et al.

(10) Patent No.: US 11,732,085 B2
(45) Date of Patent: Aug. 22, 2023

(54) EPOXY COMPOSITION

(71) Applicant: Dow Global Technologies LLC, Midland, MI (US)

(72) Inventors: Bharati Balijepalli, Midland, MI (US); David H. Bank, Midland, MI (US); Michael A. Lowe, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 67 days.

(21) Appl. No.: 17/428,493

(22) PCT Filed: Jan. 29, 2020

(86) PCT No.: PCT/US2020/015528
§ 371 (c)(1),
(2) Date: Aug. 4, 2021

(87) PCT Pub. No.: WO2020/167467
PCT Pub. Date: Aug. 20, 2020

(65) Prior Publication Data
US 2022/0017685 A1    Jan. 20, 2022

Related U.S. Application Data

(60) Provisional application No. 62/806,307, filed on Feb. 15, 2019.

(51) Int. Cl.
| | | |
|---|---|---|
| *C08J 5/24* | (2006.01) | |
| *C08G 59/38* | (2006.01) | |
| *C08G 59/40* | (2006.01) | |
| *C08G 59/68* | (2006.01) | |
| *B32B 27/38* | (2006.01) | |
| *C08L 63/00* | (2006.01) | |
| *C08L 63/02* | (2006.01) | |
| *C08L 63/04* | (2006.01) | |
| *C08G 59/26* | (2006.01) | |
| *C08G 59/44* | (2006.01) | |
| *C08K 5/103* | (2006.01) | |
| *C08K 5/5377* | (2006.01) | |
| *C09K 21/12* | (2006.01) | |

(52) U.S. Cl.
CPC ........... *C08G 59/26* (2013.01); *C08G 59/44* (2013.01); *C08G 59/686* (2013.01); *C08J 5/243* (2021.05); *C08K 5/103* (2013.01); *C08K 5/5377* (2013.01); *C09K 21/12* (2013.01); *C08J 2363/00* (2013.01); *C08K 2201/005* (2013.01); *C08K 2201/014* (2013.01)

(58) Field of Classification Search
None
See application file for complete search history.

(56) References Cited

U.S. PATENT DOCUMENTS

| | | | |
|---|---|---|---|
| 3,686,359 A | 8/1972 | Soldatos et al. | |
| 4,659,779 A | 4/1987 | Bagga et al. | |
| 4,701,378 A | 10/1987 | Bagga et al. | |
| 5,112,932 A | 5/1992 | Koenig et al. | |
| 7,070,861 B2 | 7/2006 | Taguchi et al. | |
| 8,021,752 B2 | 9/2011 | Honda et al. | |
| 8,071,217 B2 | 12/2011 | Kramer et al. | |
| 10,167,377 B2 | 1/2019 | Jeong et al. | |
| 2008/0315164 A1 | 12/2008 | Wei | |
| 2011/0319525 A1 | 12/2011 | Maeda et al. | |
| 2012/0071585 A1 | 3/2012 | Nohara et al. | |
| 2012/0136094 A1 | 5/2012 | Chen et al. | |
| 2013/0025916 A1 | 1/2013 | Levchik et al. | |
| 2014/0010979 A1 | 1/2014 | Tomioka et al. | |
| 2015/0344649 A1 | 12/2015 | Sequeira | |
| 2018/0155489 A1* | 6/2018 | Ushiyama | C08J 5/243 |
| 2018/0291164 A1 | 10/2018 | Bank et al. | |

FOREIGN PATENT DOCUMENTS

| | | |
|---|---|---|
| EP | 1359174 A1 | 11/2003 |
| JP | 2007302746 A | 11/2007 |
| JP | 2011148938 A | 8/2011 |
| JP | 05570380 | 8/2014 |
| KR | 1530754 | 6/2015 |
| KR | 2017022874 | 3/2017 |
| WO | WO-2017066056 A1 * | 4/2017 ........... C08G 59/245 |

OTHER PUBLICATIONS

Technical Data for Technicure® Nano-Dicy, provided by ACCI Specialty Materials (no date).*
PCT/US2020/015528, International Search Report and Written Opinion dated May 19, 2020.
PCT/US2020/015528, International Preliminary Report on Patentability dated Aug. 10, 2021.

* cited by examiner

*Primary Examiner* — Michael J Feely

(57) ABSTRACT

A flame retardant epoxy resin composition for preparing a flame retardant fiber composite including: (a) at least one epoxy resin; (b) at least one flame retardant agent for improving the flammability performance of carbon fiber-reinforced epoxy composites; (c) at least one mold release agent; (d) at least one curing agent; and (e) at least one catalyst; a prepreg prepared using the above epoxy resin composition; and a flame retardant fiber composite prepared using the above prepreg.

11 Claims, No Drawings

EPOXY COMPOSITION

FIELD

The present invention relates to an epoxy resin composition and more particularly the present invention relates to a flame-retardant epoxy resin composition for preparing a fiber composite.

BACKGROUND

Epoxy carbon fiber composites have been increasingly used in automotive, aerospace, electronics, and other industries because of the considerable strength and stiffness that the carbon fiber composites provide, and the potential for obtaining significant weight savings when using such carbon fiber composites. Although epoxy carbon fiber composite materials are superior in terms of weight reduction compared with metals or metal alloys, epoxy carbon fiber composite materials are inferior in terms of the ability of the epoxy carbon fiber composite materials to retard the spread of a fire. This limits the epoxy carbon fiber composite materials for use in applications where extremely stringent flame retardancy requirements must be met. Materials used for applications such as electrical/electronic equipment or certain segments within the transportation market such as powerboat racing, aerospace, defense, rail and hazardous goods vehicles are often strongly required to be flame retardant so as to prevent accidents such as ignition or burning of equipment casings or parts, which may occur when the casings or parts are exposed to heat developed inside the equipment or high temperatures outside the equipment.

Epoxy carbon fiber composites are typically based on thermosets such as diglycidylether of bisphenol A (DGEBA). Such thermosets are not self-extinguishing and show strong burning and dripping upon being exposed to a flame. The flame retardancy of epoxy carbon fiber composites can be improved by the addition of a flame retardant (FR) agent. Traditionally, halogen flame-retardants have been the most widely used. While halogen FR agents are very effective when used in composite materials, the halogen FR agents can sometimes generate a noxious gas, such as a hydrogen halide or an organic halogen compound, during the time period from when the composite materials catch fire to the time the fire is extinguished. And it is known that incineration of plastic materials containing a halogen flame-retardant at insufficiently high temperatures (e.g. less than (<) 900 degrees Celsius (° C.)) emits poly-halogenated dioxins. Much effort has been made over the past decade or so to develop non-halogen FR agents. While the known non-halogen FR agents generally improve the flame resistance of epoxy carbon fiber composites containing such non-halogen FR agents, in many instances, incorporation of the non-halogen FR agents into an epoxy formulation can be accompanied by a reduction in thermal and mechanical properties of the composite materials made from such epoxy formulations. Addition of FR agents to a resin formulation also tends to increase the viscosity of the matrix resin significantly (e.g., greater than (>) 10 Pascals-seconds (Pa·s) at 110° C.). Impregnating a carbon fiber fabric with a high viscosity matrix resin is difficult to accomplish. Epoxy carbon fiber composites for automotive applications require the use of a low viscosity (e.g., <10 Pa·s) at infusion temperature (e.g., about 100° C.-130° C.) for good fiber impregnation and a high cured glass transition temperature (Tg). Additionally, the epoxy carbon fiber composite parts targeted for use in high speed automated manufacturing systems also require rapid cure rates and low to negligible prepreg tack for automated handling.

There are known epoxy composites that have the requisite cure speed and physical or mechanical properties but none of the known epoxy composites combine the requisite cure speed, physical properties, and mechanical properties with a flame retardancy property. For example, WO2017066056 discloses an epoxy resin composition which includes an epoxy resin component (A) containing an oxazolidone, an epoxy resin component (B), dicyandiamide (dicy) particles, and an epoxy soluble latent catalyst. The dicy particles have a particle distribution in which 98 percent (%) of the dicy particles have a diameter of <10 microns (μm) and at least 35% of the dicy particles have a particle size of <2 μm. The epoxy resin composition disclosed in WO2017066056 does not include a flame retardant agent.

Other epoxy formulations that include a flame-retardant agent are known in the art, but such known epoxy formulations do not have the requisite Tg and/or tack-free properties desirable for automated processing. For example, EP1359174A1, US20140010979A1, EP2439222A1, and EP2543693B1 describe various epoxy resin compositions including a flame retardant, but the above references do not provide an epoxy resin composition with the desired Tg and/or tack-free properties.

Still other epoxy formulations that include a flame-retardant agent are known in the art, but such known epoxy formulations use different combinations of components to make up the composition and which may provide an epoxy resin composition which does not achieve one or more properties such as sufficient flame retardancy, Tg and/or tack-free properties. For example, KR1530754B1, JP2011148938A and KR2017022874A describe an epoxy resin composition which use a different combination of epoxy resins, FR agents, curatives and/or catalysts.

SUMMARY

The present invention is directed to an oxazolidone-based epoxy resin formulation or composition that includes a predetermined selection and a predetermined dosage of a non-halogenated, phosphorus-containing (phosphinate) flame retardant agent. The above flame retardant agent is added to the oxazolidone-based epoxy resin composition to improve the flammability performance of carbon fiber reinforced epoxy composites made from such flame-retardant oxazolidone-based epoxy resin composition.

In one embodiment, the present invention includes a flame-retardant epoxy resin composition for preparing a flame-retardant fiber composite including: (a) at least one oxazolidone-based epoxy resin; (b) at least one non-halogenated, phosphorus-containing flame retardant agent for improving the flammability performance of carbon fiber-reinforced epoxy composites made from the flame retardant epoxy resin composition; (c) at least one mold release agent; (d) at least one curing agent; and (e) at least one catalyst.

In another embodiment, the present invention includes a flame-retardant fiber composite prepared with the above epoxy resin composition.

The present invention provides an epoxy resin composition that has the requisite cure speed, physical or mechanical properties, and flame retardancy by using a unique preselected combination of solid and liquid epoxy resins and a phosphorus-based FR agent. An advantage of the composition includes using an FR agent with an average particle size of <5 μm to avoid particulate filtration by the carbon fiber reinforcement. The epoxy carbon fiber prepreg of the present invention is tack-free at room temperature (e.g., about 22° C.), and cures in <3 minutes (min) at 150° C. The carbon fiber composite possesses a cured Tg of >150° C. and the cured composite can achieve a UL 94 V-0 classification.

DETAILED DESCRIPTION

"Fire retardant" and "flame retardant" (abbreviated herein "FR") are terms that can be used herein interchangeably; and mean a material, substance or additive that is used to prevent or slow the spread of fire or reduce a fire's intensity. A material, such as a carbon fiber fabric material described herein, treated with a curable FR epoxy resin composition as described herein, becomes "slow burning" or "self-extinguishing"; and the material does not melt or drip when exposed to heat or an open flame (i.e., an ignition source). A flame retardant agent is not a "flame-resistant" agent or a "flame-proof" agent; but instead, a flame retardant agent herein is an agent designed to slow down the spread of fire. When exposed to an ignition source, a flame retardant is activated by the presence of the ignition source and will function to suppress the fire; i.e., a flame retardant is intended to prevent or slow down the further development of ignition or combustion. Thus, is fire retardant material stunts the spread of fire, i.e., the fire retardant acts to keep fire from spreading or to reduce the chance of fire spreading.

In one general embodiment, the flame-retardant (FR) composite of the present invention includes an FR epoxy resin formulation or composition and a carbon fiber reinforcement impregnated with the FR epoxy resin composition which is cured to form a FR carbon fiber composite.

In a broad embodiment, the curable FR epoxy resin composition useful in the present invention includes: (a) at least one epoxy resin, such as a solid epoxy resin which can be, for example, an oxazolidone based solid epoxy resin (i.e., at least one oxazolidone group-containing solid epoxy resin); (b) at least one non-halogenated, phosphorus-containing flame retardant agent for improving the flammability performance of fiber-reinforced epoxy composites such as at least one non-halogenated, phosphorus-containing flame retardant agent that provides a fiber reinforced epoxy resin composite that retains its mechanical properties such as tensile strength and stiffness while the fiber reinforced epoxy resin composite exhibits a flame retardancy of at least a UL 94 V-1 rating; (c) at least one mold release agent; (d) at least one curing agent; and (e) at least one catalyst.

The curable FR epoxy resin composition of the present invention can include at least one epoxy resin (i.e., the epoxy component can be a single epoxy resin or a mixture/combination of two or more epoxy resins). In another embodiment, the curable FR epoxy resin composition of the present invention may contain a mixture or combination of (1) at least one epoxy resin as a first resin and (2) a second resin different from the epoxy resin; and if two or more different resins are present, the epoxy resin(s) is generally the predominant component of the curable resin composition.

A wide range of epoxy resins may be suitable for use as the epoxy resin component of the curable composition. The epoxy resin useful for preparing the curable composition may include, for example, a liquid epoxy resin, an epoxy novolac resin, a solid epoxy resin, or any combination thereof. The epoxy resins useful in the present invention can be any known aliphatic, cycloaliphatic or aromatic epoxy resin. In one preferred embodiment, an epoxy resin having an aromatic group, and an epoxy resin containing either of a glycidyl amine structure and a glycidyl ether structure can be used. In another embodiment, an alicyclic epoxy resin may also be used preferably.

Exemplary of epoxy resins useful in the present invention that contain a glycidyl amine structure, can include various isomers of tetraglycidyl diaminodiphenyl methane, N,N,O-triglycidyl-p-aminophenol, N,N,O-triglyciyl-m-aminophenol, N,N,O-triglyciyl-3-methyl-4-aminophenol, triglyciyl aminocresol; and mixtures thereof.

An epoxy resin containing a glycidyl ether structure, can include, for example, a bisphenol A type epoxy resin, a bisphenol F type epoxy resin, a bisphenol S type epoxy resin, a phenolic novolac type epoxy resin, a cresol novolac type epoxy resin; and mixtures thereof.

The epoxy resin useful in the present invention may have a non-reactive substituent group at, for example, the aromatic ring structure. For example, the non-reactive substituent group can include an alkyl group (e.g. methyl, ethyl or isopropyl), an aromatic group (e.g. phenyl), an alkoxyl group, an aralkyl group, a halogen group (e.g. chlorine or bromine); and mixtures thereof.

In one embodiment, the epoxy resin or mixture thereof by itself may be a non-tacky solid at 23° C. In another preferred embodiment, the epoxy resin or mixture thereof by itself may be heat-softened when brought to a temperature of from 40° C. to 80° C., and from 40° C. to 65° C. in another embodiment. In still another embodiment, the epoxy resin may include at least one epoxy resin that is solid at 23° C.; and in yet another embodiment, the epoxy resin composition may contain a mixture of one or more epoxy resins that are solid at 23° C. and one or more epoxy resins that are liquid at 23° C.

The epoxy resin or mixture thereof may have an epoxy equivalent weight (EEW) of, for example, at least 210 grams/equivalent (g/eq) or at least 220 g/eq; and up to 1,000 g/eq in one embodiment, up to 500 g/eq in another embodiment, up to 350 g/eq in still another embodiment, or up to 300 g/eq in yet another embodiment.

The epoxy resin or mixture thereof may have a number average epoxy functionality of, for example, at least 2.4 epoxy groups per molecule in one embodiment, at least 2.5 epoxy groups per molecule in another embodiment or at least 2.6 epoxy groups per molecule in still another embodiment. In addition, the number average epoxy functionality may be, for example, up to 6 epoxy groups per molecule in one embodiment, up to 4 epoxy groups per molecule in another embodiment, up to 3.5 epoxy groups per molecule in still another embodiment or up to 3.0 epoxy groups per molecule in yet another embodiment.

In some preferred embodiments of the present invention, the epoxy resin may contain at least one polyglycidyl ether of a polyphenol. The polyglycidyl ethers of a polyphenol may include, for example: (i) diglycidyl ethers of polyhydric phenol compounds such as resorcinol, catechol, hydroquinone, biphenol, bisphenol A, bisphenol AP (1,1-bis(4-hydroxylphenyl)-1-phenyl ethane), bisphenol F, bisphenol K, bisphenol M, and tetramethylbiphenol; (ii) diglycidyl ethers of aliphatic glycols and polyether glycols such as the diglycidyl ethers of C2-24 alkylene glycols and poly(ethylene oxide) or poly(propylene oxide) glycols; (iii) polyglycidyl ethers of phenol-formaldehyde novolac resins (epoxy novolac resins), alkyl substituted phenol-formaldehyde resins such as epoxy cresol novolac resins, phenol-hydroxybenzaldehyde resins and cresol-hydroxybenzaldehyde resins, in each case having three or more epoxy groups per molecule; (iv) oxazolidone group-containing polyglycidyl ethers of phenolic compounds such as are described for example in U.S. Pat. No. 5,112,932. Such epoxy resins include reaction products of a diisocyanate such as diphenylmethane diisocyanate or toluene diisocyanate with a diglycidyl ether of a diphenol such as resorcinol, catechol, hydroquinone, biphenol, bisphenol A, bisphenol AP (1,1-bis (4-hydroxylphenyl)-1-phenyl ethane), bisphenol F, bisphenol K and tetramethylbiphenol. These epoxy resins may have epoxy functionalities of, for example, from 1.9 to 2.5 in one embodiment, and from 1.9 to 2.2 in another embodiment; and epoxy equivalent weights of, for example, from 300 to 500 in one embodiment, and from 325 to 450 in another embodiment; (v) dicyclopentadiene-phenol resins and dicyclopentadiene-substituted phenol resins, (vi) partially advanced epoxy resins of any of types (i), (ii) or (iii) described above; and (vii) any combination of two or more of the above epoxy resins.

Many of the above-mentioned epoxy resins of types (i)-(vi) are commercially available. And, some of the commercial epoxy resin products can often be a blend of two or more of the above-described epoxy resins. For example, commercially available polyglycidyl ethers of bisphenol A and bisphenol F that can be useful in the present invention include those available from Olin Corporation under the designations D.E.R.® 330, D.E.R. 331, D.E.R. 332, D.E.R. 354, D.E.R. 383, D.E.R. 661 and D.E.R. 662 resins. Generally, such epoxy resins have epoxy functionalities of >2. Commercially available diglycidyl ethers of polyglycol can include D.E.R. 732 and D.E.R. 736 available from Olin Corporation.

In other embodiments, commercially available epoxy novolac resins that can be useful in the present invention may include, for example, D.E.N.® 354, D.E.N. 431, D.E.N. 438 and D.E.N. 439 available from Olin Corporation. In general, these epoxy novolac resin products may have epoxy equivalent weights of, for example, from 150 to 200 in one embodiment; and may have epoxy functionalities of, for example, from 2.2 to 5.0 in one embodiment and from 2.6 to 4.0 in another embodiment. Another suitable commercially available epoxy resin that contains oxazolidone groups and that can be useful in the present invention may include D.E.R. 6508 (available from Olin Corporation).

Other embodiments that can be useful in the present invention may include commercially available epoxy cresol novolac resins such as Huntsman Araldite ECN 1273; Epon® 164 and Epon 165 available from Hexion; and Epiclon® N-660, Epiclon N-664, Epiclon N-670, Epiclon N-673, Epiclon N-680, Epiclon N-690, and Epiclon N-695 available from DIC Americas. Generally, these epoxy cresol novolac resin products may have epoxy equivalent weights of, for example, from 180 to 250 in one embodiment; and may have epoxy functionalities of, for example, from 2.2 to 5.0 in one embodiment and from 2.6 to 4.8 in another embodiment.

In one embodiment of the present invention, the epoxy resin useful in the epoxy resin composition of the present invention may comprise a liquid epoxy resin in combination with an epoxy novolac resin. For example, the epoxy resin composition may contain a liquid epoxy resin that is a diglycidyl ether of bisphenol A and an epoxy novolac resin that is a polyglycidyl ether of a phenol-formaldehyde novolac. In one embodiment, the diglycidyl ethers of bisphenol A epoxy resin can be present in the composition in an amount of from 0 weight percent (wt %) to 65 wt % and the epoxy novolac resin can be present in the composition in an amount of from 0 wt % to 70 wt %, based on the total weight of all epoxy resins in the epoxy resin composition. In one preferred embodiment, the diglycidyl ether resin can be present in the composition in an amount of from 10 wt % to 40 wt % and the epoxy novolac resin can be present in the composition in an amount of from 15 wt % to 62 wt %, based on the total weight of all epoxy resins in the epoxy resin composition. In another preferred embodiment, the diglycidyl ether liquid epoxy resin can be present in the composition in an amount of from 15 wt % to 30 wt % and the epoxy novolac resin can be present in the composition in an amount of from 25 wt % to 46 wt %, based on the total weight of all epoxy resins in the epoxy resin composition.

In another embodiment, when the epoxy component in the composition is only a liquid epoxy resin, the amount of the liquid epoxy resin present in the epoxy resin composition may range from 35 wt % to 90 wt % in one embodiment, from 45 wt % to 85 wt % in another embodiment, and from 55 wt % to 75 wt % in still another embodiment, based on the total weight of the components in the epoxy resin composition.

In still another embodiment, when the epoxy component in the composition is only a solid epoxy resin, the amount of the solid epoxy resin useful in the epoxy composite composition may range from 10 wt % to 65 wt %; from 15 wt % to 55 wt % in another embodiment; and from 20 wt % to 45 wt % in even still another embodiment, based on the total weight of all epoxy resins in the epoxy resin composition. In one preferred embodiment, the amount of the solid epoxy resin in the epoxy resin composition can be from 25 wt % to 43 wt %, based on the total weight of the components in the epoxy resin composition.

In yet another embodiment, when the epoxy component in the curable resin composition contains a mixture of any of the above-mentioned types of epoxy resins (a)-(f), such epoxy resins together may constitute at least 50 wt %, at least 75 wt %, at least 90 wt %, or at least 95 wt % of the total weight of all epoxy resins present in the curable resin composition. Alternatively, the combination of epoxy resins used in the composition may constitute 100% of the total weight of all epoxy resins.

In even still another embodiment, the curable resin composition may include a combination of (1) at least one diglycidyl ether of a bisphenol product, (2) at least one epoxy novolac resin product, and (3) at least one oxazolidone-containing epoxy resin product, these three products together constituting 90 wt % to 100 wt % or 95 wt % to 100 wt % of the total weight of all epoxy resins present in the curable resin composition.

In some embodiments, other epoxy resins may be present in the composition, but in such embodiments the other epoxy resins are present in minor quantities, if present at all. Among these other epoxy resins are cycloaliphatic epoxides including those described in U.S. Pat. No. 3,686,359. These cycloaliphatic epoxides can include, for example, (3,4-epoxycyclohexyl-methyl)-3,4-epoxy-cyclohexane carboxylate, bis-(3,4-epoxycyclohexyl) adipate, vinylcyclohexene monoxide, and mixtures thereof.

In other embodiments, the epoxy resins that can be used in the composition are not necessarily rubber-modified and do not necessarily contain polyether groups. However, rubber modification and modification with epoxy-terminated polyethers and/or tougheners containing a polyether that has capped terminal isocyanate groups is within the scope of the present invention.

The FR agent that can be used to prepare the FR epoxy resin composition of the present invention can include one or more flame retardant agents known in the art. The FR agent can include phosphorous-containing materials, either the chemical element itself such as red Phosphorus or alternatively, a variety of inorganic or organic compounds containing Phosphorous can be used. For example, the FR agent may be selected from a group comprising, elemental red phosphorous, melamine phosphate, dimelamine phosphate, melamine pyrophosphate, triaryl phosphates, resorcinol bis (diphenylphosphate), tris (chloropropyl) phosphate, ammonium polyphosphate, phosphinic acid derivatives, inorganic phosphinates such as, for example, aluminium phosphinates or metal salts of organic phosphinic acids and mixtures thereof. Aluminum diethyl phosphinate can be used in one preferred embodiment.

If a solid FR agent is used, it should preferably have a particle size which is <5 μm. In general, if the epoxy resin composition contains solid particles >5 μm in size, the particles tend to be filtered out by the carbon fiber fabrics during the infusion process. Filtering out the FR agent could be detrimental to the flame resistance of the composite article.

The amount of FR agent used to make the FR epoxy resin composition can be, for example, from 1 wt % to 30 wt % in one embodiment, from 5 wt % to 25 wt % in another embodiment and from 10 wt % to 20 wt % in still another embodiment. Addition of >30 wt % of FR agent can reduce the thermal and mechanical properties of the molded composite article. When a solid FR agent is used, addition of >30 wt % of the FR agent to the formulation can result in a large increase in viscosity (for example, >10 Pa·s at infusion temperature) thus decreasing the processability of the resin.

The mold release agent that can be used to prepare the FR epoxy resin composition of the present invention can include one or more mold release agents known in the art. For example, the mold release agent in the curable FR epoxy resin composition can include at least one internal mold release (IMR) agent as component (c). An IMR agent is a substance contained within the curable resin composition that reduces adhesion of the cured composition to a mold or other surface against which the curable resin composition has cured. Examples of IMR agents include fatty acids having 16 or more carbon atoms in one embodiment and 18 carbon atoms to 36 carbon atoms in another embodiment. Also useful in the present invention can be IMR agents such as alkali metal or ammonium salts, monoalkyl esters, monoalkylamides and di- and/or tri-glycerides of such fatty acids; and mixtures thereof. A useful type of internal mold release includes a mixture of a fatty acid having 18 carbon atoms to 36 carbon atoms and a di- and/or tri-glyceride of a fatty acid having 10 carbon atoms to 36 carbon atoms. In one preferred embodiment, the IMR agent can include a montanic ester of triglycerol such as Licolub WE4 available from Clamant. The IMR agent can be present in the curable FR epoxy resin composition in an amount effective to reduce the adhesion of the cured composition to the mold or other surface. A suitable amount of IMR agent present in the curable composition may be, for example, at least 0.5 parts by weight per 100 parts by weight of the epoxy resin(s) (PHR) in one embodiment, at least 1 PHR in another embodiment, from at least 1.5 PHR up to 10 PHR in still another embodiment, up to 7 PHR in yet another embodiment, up to 5 PHR in even still another embodiment, or up to 4 PHR in even yet another embodiment.

The curing agent that can be used to prepare the FR epoxy resin composition of the present invention can include one or more curing agents known in the art used for curing of epoxy resin. In one preferred embodiment, the curing agent useful in the curable epoxy resin composition includes at least one latent type curing agent. The latent curing agent should have an activation temperature of at least 100° C. in one embodiment; and at least 120° C. in another embodiment. The curing agent is latent because the curing agent causes the epoxy resin to cure (cross-link) when heated to a temperature of at least 100° C. or greater, but does not cause the resin to cure (or the resin cures very slowly) at room temperature or even at temperatures of up to at least 50° C. The curing agent may be latent, for example, due to having blocked reactive groups, encapsulation, by virtue of having an elevated melting temperature (e.g., >200° C.), and/or by virtue of having limited solubility in the epoxy resin (or mixture) until exposed to an elevated temperature (e.g., >150° C.).

The activation temperature of a curing agent can be evaluated by combining the curing agent and a diglycidyl ether of bisphenol A having an epoxy equivalent weight of from 182 to 192 at a stoichiometric ratio, applying the combination between two substrates, heating at various temperatures for 2 hr, and then in each case measuring the lap shear strength according to DIN ISO 1465. Another sample can be cured 30 min at 180° C., which conditions represent "full cure" conditions. The "activation temperature" refers to the lowest curing temperature at which the combination achieves at least 30% of the lap shear strength obtained under the "full cure" conditions.

Suitable latent curing agents useful in the composition of the present invention can include, for example, boron trichloride/amine and boron trifluoride/amine complexes; melamine; diallylmelamine; aminotriazoles such as 3-amino-1,2,4-triazole; dicyandiamide; guanamines such as methyl guanidine, dimethyl guanidine, trimethyl guanidine, tetramethyl guanidine, methylisobiguanidine, dimethylisobiguanidine, tetramethylisbiguandidine, heptamethylisobiguanidine, hexamethylisobiguanidine, acetoguanamine, and benzoguanamine; and mixtures thereof. Other examples of suitable latent curing agents that may be used in embodiments of the present invention can include hydrazides such as adipic dihydrazide, stearic dihydrazide, isophthalic dihydrazide, and terephthalic dihydrazides; semicarbazide; cyanoacetamide; aromatic polyamines such as diaminodiphenylsulphones; and mixtures thereof. In one embodiment, for example, a mixture of a guanamine and a dihydrazide may be used. The use of dicy, isophthalic acid dihydrazide, adipic acid dihydrazide and 4,4'-diamino-diphenylsulphone can be used in one preferred embodiment. In still another preferred embodiment, the curing agent can be dicy. A suitable dicy latent curing agent that may be used in embodiments of the present invention is available from AC Catalysts Inc. under the product name Technicure Nanodicy.

In a preferred embodiment the curing agent is a micronized latent curing agent such as dicy. Typically, the micronized latent curing agent has a particle distribution in which 98% of the particles have a maximum particle diameter that is <10 μm and where at least 35% of particles have a particle diameter that is <2 μm provides for a faster cure rate of the epoxy resin composition. Fast cure rates are particularly desirable in automated applications where high throughput in the production of molded articles and parts is required.

In one preferred embodiment, the latent curing agent has a particle size distribution in which 98% of the particles have a maximum particle diameter that is <6 μm; and in another embodiment, 98% of the particles have a maximum particle diameter that is <4 μm. In still another embodiment, at least 45% of the particles have a diameter of <2 μm, and in yet another embodiment at least 55% of the particles have a diameter of <2 μm, and even still another embodiment at least 90% of the particles have a diameter of <2 μm. In a preferred embodiment, 100% of the particles have a diameter of <2 μm. The particle size can be measured with a laser diffraction system, such as the Beckman Colter LS 13-320 Laser Diffraction Particle Size Analyzer equipped with the Tornado Dry Powder System.

The latent curing agent in the epoxy resin composition is present in an amount that is sufficient to cure the epoxy resin. In one general embodiment, the latent curing agent may be present in the composition in an amount sufficient to provide at least 0.75 epoxy-reactive groups per epoxide group provided by the epoxy resin (or mixture thereof). In another embodiment, the amount may be at least 0.85 epoxy-reactive groups per epoxide group, at least 0.90 epoxy-reactive groups per epoxide group in still another embodiment, or at least 0.95 epoxy-reactive groups per epoxide group in yet another embodiment. In other embodiments, the curing agent can provide up to 1.5 epoxy-reactive groups per epoxy group, up to 1.25 epoxy-reactive groups per epoxy group, up to 1.15 epoxy-reactive groups per epoxy group, up to 1.10 epoxy-reactive groups per epoxy group, up to 1.05 epoxy-reactive groups per epoxy group, or up to 1.02 epoxy-reactive groups per epoxy group.

The amount of the curing agent contained in the epoxy resin composition is present in an amount relative to the total amount of epoxy resins in the composition. The curing agent present in the epoxy resin composition is an amount which is appropriate to cure all the epoxy resins used in the epoxy resin composition and is controlled appropriately depending upon the kinds of epoxy resin used and curing agent used. For example, the amount of curing agent used to make the FR epoxy resin composition can be, for example, from 5 wt % to 15 wt % in one embodiment, from 6 wt % to 12 wt % in another embodiment and from 7 wt % to 8 wt % in still another embodiment, based on the total weight of the epoxy resin composition.

The curable FR epoxy resin composition of the present invention can include one or more accelerators for the reaction of the epoxy resin in the presence of a curing agent (such as dicy). The accelerator or curing catalyst can be selected from catalysts known in the art. The resin composition includes at least one accelerator (or curing catalyst) that can also be an encapsulated (or blocked) or otherwise a latent type accelerator that becomes active only upon exposure to elevated temperatures (e.g. >100° C.). The latency of the catalyst can come directly from the chemical structure of the catalyst. For example, the actual catalytically active species of a blocked latent catalyst is generally not present until generated by an unblocking reaction that occurs at the aforementioned elevated temperatures which are typically used during the molding process. The accelerator additive or latent catalyst can also be soluble in the epoxy resins of the curable composite composition so that when solubilized, the solubilized catalyst can be latent until heated to the aforementioned elevated temperatures.

As used herein, the term 'soluble" with respect to the latent catalyst requires that the catalyst be substantially dissolved in the epoxy resin composition prior to infusion of the epoxy resin composition into a structural material such a fibrous material described herein below. "Substantially dissolved" in one embodiment herein means that >90% of the catalyst is dissolved in the epoxy resin composition, >95% of the catalyst is dissolved in the epoxy resin composition in another embodiment, and 100% of the catalyst in still another embodiment is dissolved in the epoxy resin composition. Typically, it is desirable to dissolve the catalyst in the epoxy resin composition during mixing of the epoxy resin composition.

Examples of accelerators that may be used in embodiments of the present invention can include ureas, substituted ureas, modified imidazoles, and mixtures thereof. For example, the ureas useful in the present invention composition can include toluene bis-dimethylurea; p-chlorophenyl-N,N-dimethylurea; 3-phenyl-1,1-dimethylurea; 3,4-dichlorophenyl-N,N-dimethylurea; N-(3-chloro-4-methylphenyl)-N',N'-dimethylurea; various aliphatic urea compounds such as the urea compounds described in EP 1 916 272; and mixtures thereof. Other suitable latent catalysts useful in the present invention can include, for example, tert-acryl- or alkylene amines such as benzyldimethylamine; 2,4,6-tris(dimethylaminomethyl)-phenol; piperidine or derivatives thereof; 2,4-diamino-6-[2'-methylimidazolyl-(I')]-ethyl-s-triazine, 2,4-diamino-6-[2'-methyl imidazolyl-(I')]-ethyl-s-triazine isocyanuric acid adduct dehydrate; $C_1$-$C_{12}$ alkylene imidazole or N-arylimidazoles, such as 2-phenyl-imidazole, 2-methylimidazole, 1-methylimidazole, 2-ethyl-4-methylimidazole, 4,4'-methylene-bis(2-ethyl-5-methylimidazole) 2-ethyl-2-methylimidazol, or N-butylimidazol and 6-caprolactam; 2,4,6-tris(dimethylaminomethyl)phenol integrated into a poly(p-vinylphenol) matrix (as described in EP 0 197 892); or 2,4,6-tris(dimethylaminomethyl)phenol integrated into a novolac resin, including those resins described in U.S. Pat. No. 4,701,378; and mixtures thereof.

In one preferred embodiment, the soluble latent catalyst useful in the present invention can be blocked urea catalysts described above which are latent and which are soluble in the epoxy resin. An example of a suitable latent urea catalyst that may be used in embodiments of the epoxy resin composite composition of the present invention can be toluene bis-dimethyl urea ("TBDMU").

The amount of curing catalyst used to make the FR epoxy resin composition should be present in the epoxy resin composition in a catalytically effective amount. For example, such suitable catalytically effective amount may be from 0.1 PHR to 10 PHR in one general embodiment, 0.25 PHR to 5 PHR in another embodiment, and 1 PHR to 5 PHR in still another embodiment.

The curable epoxy resin composition may contain various other optional ingredients, compounds or additives as component (f). The optional additives that may be added to the curable resin formulation of the present invention may include, for example, one or more reaction inhibitors, diluents, tougheners, rubbers, plasticizers, extenders, colorants, smoke suppressants, thixotropic agents, adhesion promoters, biocides, antioxidants, other co-catalysts, other accelerators, other flame retardants or fire retardants, surfactants, flow modifiers, stabilizers, and mixtures thereof. The curable resin composition may also contain finely divided solids such as calcium carbonate, fumed silica and/or carbon nanotubes that fill interstitial spaces between fibers at or near the surface of the molding compound and cured composite to provide a smoother surface. A typical epoxy resin composition may also contain some fillers, or other functional chemicals for any intended applications.

The amount of optional component when used in the curable FR epoxy resin composition can be from 0 wt % to 10 wt % in one embodiment, from 0.01 wt % to 5 wt % in another embodiment, and from 0.1 wt % to 5 wt % in still another embodiment, based on the total weight of the epoxy resin composition.

In general, the process for making the FR epoxy resin composition includes admixing: (a) at least one epoxy resin; (b) at least one non-halogenated, phosphorus-containing flame-retardant agent for improving the flammability performance of the fiber-reinforced epoxy composites; (c) at least one mold release agent; (d) at least one curing agent; and (e) at least one catalyst.

In one embodiment, and as one non-limiting illustration of the present invention, the curable FR epoxy resin composite composition may be prepared by admixing, based on the weight of the total components in the composition, from 80 wt % to 90 wt % of an epoxy resin; from 1 wt % to 20 wt % of a non-halogenated, phosphorus-containing flame retardant agent; from 6 wt % to 8 wt % of a curing agent; from 2 wt % to 5 wt % of an accelerator; and from 2 wt % to 5 wt % of an IMR agent. Additional optional compounds can also be included in the above the curable FR epoxy resin composite composition. Once the FR epoxy resin composition is formed, the composition can be combined with a structural material such as a woven matt of carbon fibers or glass fibers to manufacture the composite article.

As an illustration of the present invention FR epoxy composition, and not to be limited thereby, the FR epoxy resin composition can be prepared by admixing, for example: (a) 30.23 wt % of a first epoxy resin (e.g., D.E.N. 438 available from Olin); (b) 28.76 wt % of a second epoxy resin (e.g., D.E.R. 6508 available from Olin); (c) 16.19 wt % of a third epoxy resin (e.g., D.E.R. 331 available from Olin); (d) 1.88% of a mold release agent (e.g., Licolub WE-4 available from Clariant); (e) 6.89 wt % of a first curing agent (e.g., Technicure Nanodicy available from AlzChem); (f) 3.01 wt % of TBDMU (e.g., Omicure U410 available from CVC Thermoset Specialties); and (g) 13.04 wt % of a FR agent (e.g., Exolit OP 945 available from Clariant).

The above components of the FR epoxy composite composition can be mixed together in conventional mixing equipment and under conventional mixing conditions as known in the art. One or more additional optional compounds may be added to the resin formulation as desired before or during mixing. Generally, the mixing of the above components that make up the curable resin composition can be carried out at a temperature of from 60° C. to 90° C. in one embodiment, from 65° C. to 85° C. in another embodiment, and from 70° C. to 80° C. in still another embodiment. Once the components are thoroughly mixed forming the curable FR epoxy resin composition, the curable composition is ready for curing; and prior to curing the composition, a fibrous structure or other structural material, such as woven mat, can be infused or impregnated with the FR curable epoxy resin composition to form the epoxy-based resin prepreg that can be cured to form a composite article as described herein below.

The curable FR epoxy resin composite composition of the present invention has several beneficial properties and performances particularly when the proper ingredients are mixed with each other to form the dicy-curable epoxy resin composition. For example, some of the benefits of using the curable epoxy resin composition of the present invention includes the following benefits when the compounds making up the components of the curable composition, such as the FR agent and IMR agent, are used: (1) the FR agent and IMR agent can be readily incorporated into the epoxy resin formulation without significantly increasing the viscosity of the resin blend; (2) the IMR agent can aid in releasing a molded composite from a mold tool during molding at high temperatures (e.g., >145° C.); (3) the IMR agent can aid in releasing a molded composite in cure cycle times of <5 min; (4) the IMR agent can aid in releasing dicy-cured epoxy resins from a mold which is cured in <5 min; and (5) the FR agent, IMR agent and reaction inhibitor do not lower the Tg of a cured composite part by more than 10%. In addition, an epoxy composite article of the present invention can be achieved by formulating and curing the epoxy composite formulation of the present invention with a dicy curing agent at isothermal molding at temperatures of >140° C.

The FR agent used in the present invention does not substantially increase the viscosity of the epoxy resin composition. For example, the viscosity of the resin composition at 110° C. can be from 1 Pa·s to 15 Pa·s in one embodiment; from 1 Pa·s to 12 Pa·s in another embodiment, from 1 Pa·s to 10 Pa·s in still another embodiment. The viscosity of the resin composition can be measured by a Rheometer following standard dynamic temperature ramp measurement procedures.

The curable FR epoxy resin composition has been described above. Once the FR epoxy resin composition described above is prepared, the curable FR epoxy resin composition can contact the reinforcing fiber substrate, for example by infusing or impregnating the resin composition into the reinforcing fiber substrate to form a prepreg article.

The prepreg article of the present invention, produced with the curable FR epoxy resin composition of the present invention includes, for example: (i) a reinforcing fiber substrate and (ii) the curable FR epoxy resin composition described above which is impregnated into the reinforcing fiber substrate forming an uncured or partially cured prepreg comprising the FR epoxy resin composition and the reinforcing fiber substrate integrated into one piece.

The above described FR epoxy resin composition of the present invention may be combined with a wide variety of different reinforcing fibers (or fibrous material in the form of tows or fabrics). The reinforcing fiber used in the present invention may include, for example, a carbon fiber, a graphite fiber, a glass fiber, an aramid fiber, a silicon carbide fiber, a polyester fiber, a ceramic fiber, an alumina fiber, a boron fiber, a metal fiber, a mineral fiber, an ore fiber, a slag fiber, a natural fiber (such as basalt, hemp, seagrass, hay, flax, straw, jute, or coconut), and mixtures thereof. In one preferred embodiment, the reinforcing fiber can be selected from the group consisting of a carbon fiber, a glass fiber, an aramid fiber and mixtures thereof.

The fibers may have diameters, for example, of from 250 nanometers (nm) to 500 μm in one general embodiment, from 500 nm to 50 μm in another embodiment, and from 1 μm to 10 μm in still another embodiment.

The fibers may be continuous fibers. Continuous fibers may be, for example, unidirectional, woven, knitted, braided or mechanically entangled. Alternatively, the fibers may be chopped; short fibers having lengths, for example, of up to 100 millimeters (mm) in one embodiment and from 3 mm to 50 mm in another embodiment. Chopped fibers can be held together with a binder to form fiber matts. In a specific embodiment, the fibers can be randomly oriented chopped fibers having lengths of from 12 mm to 25 mm Generally, the fiber content of the composite composition may be, for example, from 5 wt % to 80 wt % of the total weight of the composition in one embodiment, from 20 wt % to 80 wt % in another embodiment, and from 35 wt % to 70 wt % in still another embodiment. In one preferred embodiment, the fiber content of the composite composition may be, for example, 60 wt %.

In a broad embodiment, the process of producing the prepreg of the present invention includes, for example, the steps of: (a) providing a curable FR epoxy resin composition described above; (b) providing a carbon fiber fabric substrate described above; (c) contacting, for example by infusing (or impregnating) the carbon fiber fabric substrate with the FR epoxy resin composition; and (d) heating the carbon fiber fabric substrate with the FR epoxy resin composition of step (c) sufficient to form an uncured or a partially cured prepreg.

The infusion or impregnation step (c) of the process and in general the preparation of the prepreg can be accomplished using conventional prepreg forming methods and equipment. Generally, the prepreg of the present invention may be produced by infusing (or impregnating) fibrous material (or a woven fiber fabric substrate) with the FR epoxy resin composition.

In one embodiment, the infusion of the epoxy resin composition into the fibrous material is carried out at temperatures in the range of from 90° C. to 130° C. and from 100° C. to 125° C. in another embodiment, and from 110° C. to 125° C. in still another embodiment. It should be recognized that temperature ranges outside the above ranges may also be used. However, the use of higher or lower infusion temperatures typically requires adjusting the machine speed at which the infusion process is carried out. For example, at temperatures >about 125° C., it may be necessary to carry out the infusion process at a high machine speed in order to reduce the duration of time to which the epoxy resin composition is exposed to an elevated temperature to avoid undesirable crosslinking of the epoxy resin composition. Similarly, to obtain a desired level of infusion and thereby decrease void spaces in the prepreg, the use of a low infusion temperature will typically require a low machine speed for infusing the epoxy resin composition into the fibrous material. In one preferred embodiment, the epoxy resin composition can be applied to the fibrous material at a temperature in the range described above; and the epoxy resin composition can be consolidated into the fibrous material by pressure. For example, the pressure exerted on the fibrous material and resin combination can be applied by passing the combination through one or more pairs of nip rollers.

Generally, the process of preparing a prepreg useful in the present invention includes, for example, a first step of extruding the epoxy resin composition onto a sheet material to form a film resin coating on the sheet material. The sheet material can be a release film or paper from which the film coating of the epoxy resin composition may be transferred to the fibrous material during the formation of the prepreg article (i.e., the pre-pregging process). After the film of the epoxy resin composition has been deposited on the sheet material, the sheet material with the film resin coating may be passed over a chill roll to cool the epoxy resin composition. The sheet material with epoxy resin composition can then be wound on a roll for future use.

In a second step of the process, the sheet material having the epoxy resin composition film coating can be brought into contact with a surface of a fibrous material (e.g., NCF, braided, or unidirectional fabric); and then, the sheet material having the epoxy resin composition film coating can be subjected to pressure to infuse the epoxy resin into the fibrous material. Preferably, the fibrous material and the sheet material comprising the epoxy resin composition are provided as continuous tapes from respective supply rolls.

In a preferred embodiment, the sheet of fibrous material can be sandwiched between two sheet materials on which film coatings of the epoxy resin composition are deposited. The sandwiched materials can then be subjected to heating to raise the temperature of the epoxy resin composition. In one embodiment, this heating may be accomplished by passing the combination of the fibrous material and the epoxy resin compositions over a heated plate. For example, the epoxy resin composition can be heated to a temperature of about 120° C. to facilitate rapid infusion of the epoxy resin composition into the fibrous material. Next, the combination sheet of resin and fibrous material can be passed through a pair of nip rolls that press the epoxy resin compositions into opposite surfaces of the fibrous material.

In a preferred embodiment, the combination of the fibrous material and the epoxy resin compositions can be subjected to a second step of passing the combination over a heated plated followed by passing the combination through a second nip to further infuse the epoxy resin composition into the fibrous material to form a resin infused prepreg. The prepreg may then be cooled, for example, by passing the material over a chill roll or a chill plate. After cooling, the prepreg may be wound onto a supply roll for future use.

In one preferred embodiment, the release paper or film on which the epoxy resin composition was coated as a film of resin can be rewound on a roll following the step of cooling the epoxy resin composition. As discussed above, the infusion step may be performed at an elevated temperature to lower the viscosity of the epoxy resin composition. In addition, the infused epoxy resin composition may be subjected to a partial curing step (advancement) to raise the glass transition temperature of the epoxy resin composition in the prepreg. The prepreg may then be packaged, stored, or shipped as required. As discussed previously, in some embodiments it may also be desirable to subject the prepreg to an advancement step to raise the Tg of the epoxy resin and thereby lower the tack of the prepreg.

The prepreg of the present invention has several beneficial properties and performances, besides having FR properties. For example, the prepreg can exhibit a low tack or can be "tack-free" as determined by touching the prepreg after the prepreg is produced and tactility of the prepreg does not feel sticky. The tack-free property of the prepreg can also be determined by observation, for example, by observing that when two or more prepreg layers are stacked on each other, the prepregs do not stick together.

In a first broad embodiment, the flame-retardant carbon fiber composite of the present invention can be a fully (or completely) cured composite formed by fully curing the impregnated fibrous substrate immediately after impregnating the fibrous substrate with the curable FR epoxy resin composition. In a second broad embodiment, the flame-retardant carbon composite of the present invention can be a fully (or completely) cured composite formed by first producing a partially cured tack-free prepreg as described above, and then continuing to cure the tack-free prepreg until the prepreg is fully cured. In the second broad embodiment, for example, the process for making a composite generally includes the steps of: (I) providing at least one support structure substrate; (II) providing a curable FR epoxy resin composition as described above; (III) impregnating the substrate with the epoxy composition; (IV) heating (advancing) the impregnated substrate of step (III) sufficient to form a tack-free prepreg; and (V) curing the tack-free prepreg at a temperature sufficient to completely cure the prepreg.

In one embodiment, the curing step can be carried out at isothermal molding temperatures of >140° C. in one embodiment, >145° C. in another embodiment, >150° C. in still another embodiment, and >160° C. in yet another embodiment. Other embodiments of the curing temperatures can be, for example, from 140° C. to 170° C. in one embodiment, and from 145° C. to 160° C. in another embodiment.

The carbon fiber composite of the present invention has several beneficial properties and performances including, for example, a high flame retardancy. For example, the flame retardancy of the carbon fiber composite can be sufficient to pass flame retardancy test to obtain a UL 94 rating classification of at least V-1 in one embodiment and a UL 94 rating classification of V-0 in another embodiment. The flame retardancy of the carbon fiber composite can be measured by UL 94 Standard for Tests for Flammability of Plastic Materials for Parts in Devices and Appliances (a plastics flammability standard released by Underwriters Laboratories of the United States). Advantageously, in a preferred embodiment, the composite of the present invention exhibits a flame retardancy that passes a UL 94 V-1 classification.

The composite article of the present invention has several other advantageous properties. For example, the composite can have a high glass transition temperature (Tg) of more than 140° C. in one embodiment, from 140° C. to 170° C. in another embodiment, and from 150° C. to 170° C. in still another embodiment. The Tg of the composite can be measured by the method described in ASTM D5418-15. Exemplary of some of some other advantageous properties exhibited by the composite article can include exhibiting a Tg of >150° C. and being able to mold release at a cure time of <3 min at a mold temperature of >145° C.

In a preferred embodiment, the glass transition temperature of a cured part does not decrease by more than 10% when using the formulation of the present invention with the FR agent disclosed herein, as illustrated by the following equation: $\Delta Tg = Tg_{w/oFRagent} - Tg_{w/FRagent}$, where $Tg_{w/oFRagent}$ is the glass transition temperature of the formulation without an FR agent present in the formulation; and $Tg_{w/FRagent}$ is the glass transition temperature of the formulation with a IMR agent and reaction inhibitor present in the formulation.

The carbon fiber composite of the present invention may be used in applications where flame retardancy of the composite is beneficial. For example, in a preferred embodiment, the fiber composite of the present invention can be used for manufacturing enclosures for lithium batteries.

EXAMPLES

The following examples are presented to further illustrate the present invention in detail but are not to be construed as limiting the scope of the claims. Unless otherwise indicated, all parts and percentages are by weight.

Various raw materials (ingredients or components) used in the Inventive Examples (Inv. Ex.) and the Comparative Examples (Comp. Ex.) which follow are described herein below in Table I.

TABLE I

| Raw Materials | | |
| --- | --- | --- |
| Ingredient | Brief Description of Ingredient | Supplier |
| D.E.N 438 | Epoxy novolac resin | Olin |
| D.E.R. 6508 | Oxazolidone-based solid epoxy resin (SER) | Olin |
| D.E.R. 331 | Liquid epoxy resin (LER) | Olin |
| Licolub WE-4 | Waxy mold release agent | Clariant |
| Technicure Nanodicy | Dicy; curing agent | AlzChem |
| Omicure U410M | Toluene bis-dimethyl urea (TBDMU); catalyst | CVC Thermoset Specialties |

TABLE I-continued

| Raw Materials | | |
| --- | --- | --- |
| Ingredient | Brief Description of Ingredient | Supplier |
| Exolit OP 945 | Diethyl Aluminum Phosphinate; flame-retardant agent | Clariant |
| Exolit AP 422 | Ammonium Polyphosphate; flame-retardant agent | Clariant |

General Procedure for Preparing an Epoxy Composition

Samples of epoxy resin formulations were prepared by first heating 100 grams (g) of resin(s) to 90° C. in a 20 max mixer cup (from FlackTek Inc.). The amounts of FR agent, IMR agent, Technicure Nanodicy, and accelerator described in Tables II and III were added to the resin while the resin was hot; and the resulting hot mixture was immediately placed in a SpeedMixer™ Laboratory Mixer System (from FlackTek Inc.). The mixtures of components were mixed at 3,000 revolutions per minute (RPM) until the mixture was visually homogeneous (1 min to 2 min). The resulting sample mixtures were then tested by DSC and the other property measurements described above.

General Procedure for Preparing a Clear Cast

Using the above-described epoxy resin composition, epoxy clear cast plaques were prepared by compression molding using a Wabash MPI platen press (G302H-18-CLX). A 15 centimeters (cm)×15 cm×0.32 cm mold was used to prepare the plaques. The epoxy resin was charged into the mold and the resin was allowed to cure for 10 min in the heated platen press at 150° C.

General Procedure for Preparing a Composite

The prepared resin mixture was first filmed to an appropriate thickness on one side of a release paper. Since the resin system becomes tack-free once the resin system cools down to room temperature, the resin film on the release paper can be rolled up and stored until future use. To fabricate a prepreg, the selected fiber architecture was sandwiched between two layers of the filmed resin and passed through a prepreg line containing heated tables that melt the epoxy resin, and compaction rollers that press the melted epoxy resin into opposite surfaces of the fabric. The prepreg was rolled up after the prepreg had passed beyond the heated rollers and the chiller plates. The rolls of prepregs were stored at ambient temperature (about 25° C.).

The carbon fiber fabric used was a 340 grams per square meter (g/m$^2$) stitched unidirectional (UD) fabric obtained from A&P Technology. Flat panel composite laminates were compression molded from squares of prepreg. The size dimensions of the squares of prepregs were 30.5 cm×30.5 cm. The molding conditions were as follows: a platen temperature of 150° C.; 15 s to close tool; 15 s at 2 megapascals (MPa)—3.5 MPa; 2.5 s ramp to 17 MPa with 300 s hold.

Test Methods

Epoxy Composition Viscosity

Viscosity versus temperature measurements were made on an ARES Rheometer from TA Instruments. Dynamic temperature ramp measurements were carried out in the temperature range of 40° C. to 200° C. using a disposable cup-and-plate geometry (25 mm diameter) at a ramp rate of 10° C./min.

Analytical Characterization of Compression Molded Flat Plaques

Dynamic Mechanical Analysis (DMA) testing was used to determine the glass transition temperature (Tg) of the molded material. The Tg value of the final molded parts was determined by the method described in DMA-ASTM D5418-15 (2015). Fiber content, resin content and void content of the composites was determined using ASTM D3171 (Procedure G, Matrix Burn-off in a Muffle Furnace).

Flame Retardancy

The UL 94 standard was utilized with groups of five 13 mm×125 mm sample specimens. After equilibrating in a lab environment for >24 hours (hr) at 23° C.±2° C. and 50% relative humidity, the specimens were vertically mounted in a test fixture. A 20 mm high flame was applied to the lower end of the test specimen for two time periods of 10 s each time period. After the flame application, the time was measured during which the specimen continued to burn. If the sample burns completely, the specimen is given no UL rating. If the longest burn time for any one specimen is <30 s; and the total burn time for both flame applications to all five specimens is <250 s, then the material is given a UL V-1 rating. If the longest burn time for any one specimen is <10 s and the total burn time for both flame applications to all five specimens is <50 s, then the material is given a UL V-0 rating.

Examples 1-4 and Comparative Examples A-D

The data in Table II shows that the present invention can give the required balance of glass transition temperature (Tg) and flame retardancy with only a moderate increase in viscosity. Comp. Ex. A is a resin without a FR agent. Inv. Ex. 1 and Inv. Ex. 2 contain two different levels of the flame-retardant agent: 23 wt % and 9 wt %, respectively; which corresponds to 5.5 wt % and 2.2 wt % of phosphorous, respectively.

TABLE II

Flame Retardancy Results for Epoxy Compositions without Carbon Fiber Reinforcement

| | Example | | |
|---|---|---|---|
| Ingredient | Comp. Ex. A (wt %) | Inv. Ex. 1 (wt %) | Inv. Ex. 2 (wt %) |
| DEN 438 | 34.8 | 26.7 | 31.6 |
| DER 6508 | 33.1 | 25.4 | 30.1 |
| DER 331 | 18.6 | 14.3 | 16.9 |
| Licolub WE-4 | 2.2 | 1.7 | 2.0 |
| Technicure Nano Dicy | 7.9 | 6.1 | 7.2 |
| TBDMU | 3.5 | 2.7 | 3.1 |
| Exolit OP 945 | 0 | 23.1 | 9.1 |
| Total | 100 | 100 | 100 |
| % P by weight | 0 | 5.5 | 2.2 |
| Properties | | | |
| Formulation Viscosity (Pa·s at 110° C.) | 2.2 | 16.3 | 4.5 |
| Glass Transition Temperature from DMA peak tan δ (Tg, ° C.) | 170 | 179 | 176 |
| UL 94V Flame Test | No rating | V-0 | V-0 |

Both of the clear cast specimens (Inv. Ex. 1 and Inv. Ex. 2) containing FR agent achieved a V-0 rating in the UL 94V Flame Test. For the fabrication of carbon fiber prepreg, the resin viscosity should be low (for example, <10 Pa·s at infusion temperature) for easy infusion into the carbon fiber fabric. Increase in resin viscosity could lead to composites with defects and dry areas. Adding fillers into epoxy matrix resins generally tends to significantly increase the resin viscosity, especially at high filler loading levels. A balance between the processing and improvement in flame retardance is required when using a particulate addition approach. As can be observed, while the addition of 23 wt % FR agent significantly increased the viscosity of the resin at infusion temperatures, only a moderate increase in viscosity was observed for Inv. Ex. 2.

A composite sample (Comp. Ex. B) was prepared from the epoxy resin composition of Comp. Ex. A; and a composite sample (Comp. Ex. C) was prepared from the epoxy resin composition of Inv. Ex. 2 described in Table II. A direct comparison of the flame retardancy and Tg results of these two composites (Comp. Ex. B and Comp. Ex. C) is shown in Table III. All the composites use 340 g/m² stitched UD carbon fiber fabric as reinforcement.

While the addition of 9 wt % Exolit OP 945 FR agent into the epoxy composition gave a UL 94 V-0 rating to the neat composition (Inv. Ex. 2) as described in Table II, the corresponding composite (Comp. Ex. C) could not get a favorable rating in the UL 94V Flame Test as described in Table III. Increasing the EXOLIT OP 945 content to 13 wt % (Inv. Ex. 3) greatly improved the flame retardancy of the system and the composite achieved a V-1 rating. Inv. Ex. 3 could achieve the V-1 rating with only 0.9 wt % phosphorous (P) content by total weight of the composite (resin+fiber weight). Further increasing the EXOLIT OP 945 content to 16.7 wt % (1 wt % P content) resulted in a V-0 rating for the composite of Inv. Ex. 4. Even at this high loading (16.7 wt %) of the flame retardant agent, the decrease in glass transition temperature of the composite was only around 10%.

During the infusion of resin composition into a reinforcement material for producing fiber reinforced composites, particulate materials (depending on their size) can be retained and filtered out by the fiber mats at the point of entry of the resin. In general, particles >5 μm in size tend to be filtered out by the carbon fiber fabrics. The particle size of Exolit OP 945 FR agent is advantageously low (<5 μm in size). Comp. Ex. D, on the other hand, also contains an FR agent but with a higher particle size of 15 μm. As can be observed from the data in Table III, even at a much higher % P content, the composite of Comp. Ex. D could not achieve a rating in the UL94V Flame Test.

TABLE III

Flame Retardancy of Inventive Examples with Carbon Fiber Reinforcement

| | Example | | | | |
|---|---|---|---|---|---|
| Ingredient | Comp. Ex. B | Comp. Ex. C | Comp. Ex. D | In Ex. 3 | Inv. Ex. 4 |
| DEN 438, wt % | 34.8 | 31.6 | 30.23 | 30.23 | 27.56 |
| DER 6508, wt % | 33.1 | 30.1 | 28.76 | 28.76 | 28.97 |
| DER 331, wt % | 18.6 | 16.9 | 16.19 | 16.19 | 15.52 |
| Licolub WE-4, wt % | 2.2 | 2.0 | 1.88 | 1.88 | 1.80 |
| Dicy, wt % | 7.9 | 7.2 | 6.89 | 6.89 | 6.61 |
| TBDMU, wt % | 3.5 | 3.1 | 3.01 | 3.01 | 2.88 |
| Exolit OP 945, wt % | 0 | 9.1 | 0 | 13.04 | 16.67 |
| Exolit AP 422, wt % | 0 | 0 | 13.04 | 0 | 0 |
| Total (wt %) Composite Composition | 100 | 100 | 100 | 100 | 100 |
| Resin Content, % | 35 | 30 | 39 | 28 | 26 |
| Carbon Fiber Content, % | 65 | 70 | 61 | 72 | 74 |
| Phosphorous content, wt % | 0 | 0.7 | 1.6 | 0.9 | 1 |
| Composite Properties | | | | | |
| Prepreg tack | Tack-free | Tack-free | Tack-free | Tack-free | Tack-free |

TABLE III-continued

Flame Retardancy of Inventive Examples
with Carbon Fiber Reinforcement

| | Example | | | | |
|---|---|---|---|---|---|
| Ingredient | Comp. Ex. B | Comp. Ex. C | Comp. Ex. D | In Ex. 3 | Inv. Ex. 4 |
| Molding time at 150° C., min | 3 | 3 | 3 | 3 | 3 |
| Laminate Thickness, mm | 1.9 | 1.9 | 2.6 | 1.0 | 2.0 |
| Void content, volume percent (vol %) | 0.8 | 2.3 | 1.0 | 1.9 | 2.0 |
| Glass Transition Temperature from DMA peak tan δ (Tg), ° C. | 169 | 159.7 | 164.6 | 151.1 | 158.6 |
| ΔTg (Tg$_{rw/oFR\ agent}$-Tg$_{rw/FR\ agent}$) | 0 | 9.3 | 4.4 | 17.9 | 10.4 |
| UL 94V Flame Test | No rating | No rating | No rating | V-1 | V-0 |

Table IV compares the mechanical properties of the composite of Inv. Ex. 4 which contains the highest (16.7 wt %) level of FR agent with the composite of Comp. Ex. B with no FR agent contained in the composite. Even with the addition of the high levels of FR agent there was no deterioration in mechanical properties of the molded composite part.

TABLE IV

Mechanical Properties of Inventive
Examples with Carbon Fiber Reinforcement

| Composite Properties | Comp. Ex. B | Inv. Ex. 4 |
|---|---|---|
| Tensile Strength (MPa) | 1,765 | 1,902 |
| Tensile Modulus (Gpa) | 123.7 | 142 |
| Tensile elongation (%) | 1.3 | 1.5 |

The epoxy resin compositions of the present invention (Inv. Ex. 3 and Inv. Ex. 4) resulted in tack-free prepregs well suited for automated handling. The epoxy resin compositions are extremely fast curing and achieve full cure in 3 min when compression molded at 150° C. The resulting epoxy carbon fiber composites possess a Tg>150° C. Because of the Tg of the composites, parts made of the composites and that are compression molded at around 150° C. can be released while still hot without warping. That is, the Tg enables parts to have sufficient integrity to be de-molded without first cooling the mold and the part, which in turn, enables shorter molding cycle times. The molded composite plaques exhibited a low void content of <2%, as described above, demonstrating excellent infusibility of the resin systems.

Other Embodiments

One preferred embodiment of the present invention described above includes a flame-retardant epoxy resin prepreg; and in particular a prepreg that beneficially can be tack-free. The prepreg comprises: (I) at least one support structure comprising a fiber reinforced substrate, wherein the at least one support structure is a carbon fiber reinforcement or a glass fiber reinforcement, and in one embodiment the fiber reinforcement can be a woven fabric. The prepreg also includes (II) a curable flame retardant epoxy resin composition described above which has been impregnated into the substrate.

Another preferred embodiment of the present invention described above includes a process for making the above prepreg including the steps of: (I) providing at least one support structure substrate; (II) providing a curable flame retardant epoxy resin composition described above; (III) impregnating the substrate with the curable flame retardant epoxy resin composition; and (IV) heating the impregnated substrate of step (III) sufficient to form the tack-free prepreg.

Still another preferred embodiment of the present invention described above includes a flame-retardant cured composite comprising a cured flame retardant epoxy resin composition of claim 1 that has a flame retardancy that passes at least a UL 94 V-1 rating classification or a flame retardancy that passes a UL 94 V-0 rating classification. The composition can be produced by curing the tack-free prepreg described above.

Still another preferred embodiment of the present invention described above includes a process for making a composite comprising curing the curable flame retardant epoxy resin composition described above, for example, at a curing temperature of from 145° C. to 160° C.

What is claimed is:

1. A curable flame retardant epoxy resin composition comprising:
   (a) a combination of epoxy resins comprising at least one diglycidyl ether of a bisphenol, at least one epoxy novolac resin, and at least one oxazolidone-containing epoxy resin;
   (b) at least one non-halogenated, phosphorus-containing flame retardant agent having an average particle size of less than 5 microns for providing a fiber reinforced epoxy resin composite that retains its mechanical properties while the fiber reinforced epoxy resin composite exhibits a flame retardancy of at least a UL 94 V-1 rating;
   (c) at least one mold release agent;
   (d) at least one micronized latent curing agent having a particle size distribution in which 98% of the particles have a maximum particle diameter that is less than 10 μm and where at least 35% of particles have a particle diameter that is less than 2 μm; and
   (e) at least one catalyst;
   wherein the at least one non-halogenated, phosphorus-containing flame retardant (b) is present in an amount of from 10 wt % to 20 wt %, based on the total weight of the composition.

2. The composition of claim 1, wherein the fiber reinforced epoxy resin composite maintains a tensile strength in the range of from 1,000 MPa to 2,500 MPa and a stiffness in the range of from 100 GPa to 200 GPa while the fiber reinforced epoxy resin composite exhibits a flame retardancy of at least a UL 94 V-1 rating.

3. The composition of claim 1, wherein the at least one non-halogenated, phosphorus-containing flame retardant agent (b) is aluminum diethyl phosphinate; the at least one mold release agent (c) is an ester of montanic acid with a polyol; the at least one micronized latent curing agent (d) is dicyandiamide; and the at least one catalyst (e) is a urea compound selected from one or more of toluene bis-dimethylurea, p-chlorophenyl-N,N-dimethylurea, 3-phenyl-1,1-dimethylurea, 3,4-dichlorophenyl-N,N-dimethylurea, and N-(3-chloro-4-methylphenyl)-N',N'-dimethylurea.

4. The composition of claim 1, wherein the epoxy resin composition provides a fiber reinforced epoxy resin composite having a flame retardancy of a UL 94 V-0 rating while the fiber reinforced epoxy resin composite maintains a tensile strength in the range of from 1,000 MPa to 2,500 MPa and a stiffness in the range of from 100 GPa to 200 GPa.

5. The composition of claim 1, wherein the epoxy resin composition provides an epoxy fiber prepreg that is tack-free at about 22° C., cures in less than 3 minutes at 150° C.; and is capable of providing a carbon fiber composite having a cured glass transition temperature of greater than 150° C. and a cured composite that achieves a UL 94 V-1 classification.

6. The composition of claim 1, wherein the at least one mold release agent (c) is present in an amount of 2 weight percent to 5 weight percent, based on total weight of the composition; the at least one micronized latent curing agent (d) is present in an amount of 6 weight percent to 8 weight percent, based on total weight of the composition; and the at least one catalyst (e) is present in an amount of 2 weight percent to 5 weight percent, based on total weight of the composition.

7. The composition of claim 1, wherein the at least one diglycidyl ether of a bisphenol, the at least one epoxy novolac resin, and the at least one oxazolidone-containing epoxy resin, together account for 90 wt % to 100 wt % of total weight of epoxy resins present in the composition.

8. A flame-retardant epoxy resin prepreg comprising:
   (I) at least one support structure comprising a fiber reinforced substrate; and
   (II) the curable flame retardant epoxy resin composition of claim 1 impregnated into the substrate.

9. A process for making a prepreg comprising the steps of:
   (I) providing at least one support structure substrate;
   (II) providing a curable flame retardant epoxy resin composition of claim 1;
   (III) impregnating the substrate with the curable flame retardant epoxy resin composition; and
   (IV) heating the impregnated substrate of step (III) sufficient to form a tack-free prepreg.

10. A flame-retardant cured composite comprising a cured flame retardant epoxy resin composition of claim 1 that has a flame retardancy that passes at least a UL 94 V-1 rating classification.

11. A process for making a curable flame retardant epoxy resin composition comprising admixing:
   (a) a combination of epoxy resins comprising at least one diglycidyl ether of a bisphenol, at least one epoxy novolac resin, and at least one oxazolidone-containing epoxy resin;
   (b) at least one non-halogenated, phosphorus-containing flame retardant agent having an average particle size of less than 5 microns for providing a fiber reinforced epoxy resin composite that retains its mechanical properties while the fiber reinforced epoxy resin composite exhibits a flame retardancy of at least a UL 94 V-1 rating;
   (c) at least one mold release agent;
   (d) at least one micronized latent curing agent having a particle size distribution in which 98% of the particles have a maximum particle diameter that is less than 10 um and where at least 35% of particles have a particle diameter that is less than 2 um; and
   (e) at least one catalyst;
   wherein the at least one non-halogenated, phosphorus-containing flame retardant (b) is present in an amount of from 10 wt % to 20 wt %, based on total weight of the composition.

* * * * *